United States Patent
Sautter, Jr.

[11] Patent Number: 6,048,021
[45] Date of Patent: Apr. 11, 2000

[54] CONVERTIBLE TOP MECHANISM WITH POWERED REAR ROW

[75] Inventor: Robert H. Sautter, Jr., Jackson, Mich.

[73] Assignee: Dura Convertible Systems, Adrian, Mich.

[21] Appl. No.: 09/065,755

[22] Filed: Apr. 25, 1998

[51] Int. Cl.[7] ....................................................... B60J 7/12
[52] U.S. Cl. ................ 296/117; 269/107.08; 269/107.09
[58] Field of Search .................... 296/107.01, 107.08, 296/107.09, 107.12, 116, 117, 120.1, 122

[56] References Cited

U.S. PATENT DOCUMENTS

| | | | |
|---|---|---|---|
| 4,720,133 | 1/1988 | Alexander et al. | 296/117 |
| 4,929,015 | 5/1990 | Bauer et al. | 296/116 |
| 4,958,882 | 9/1990 | Kolb | 296/117 X |
| 5,026,110 | 6/1991 | Koop et al. | 296/108 |
| 5,042,868 | 8/1991 | Nothaft et al. | 296/107 |
| 5,052,740 | 10/1991 | Baurer et al. | 296/120.1 |
| 5,067,768 | 11/1991 | Fischbach | 296/117 X |
| 5,667,269 | 9/1997 | Prenger et al. | 296/107.09 |
| 5,749,619 | 5/1998 | Mentink | 296/107.09 |
| 5,816,644 | 10/1998 | Rothe et al. | 296/117 X |

*Primary Examiner*—D. Glenn Dayoan
*Assistant Examiner*—Chad D Wells
*Attorney, Agent, or Firm*—David A. Greenlee

[57] ABSTRACT

An automobile has a convertible top storage well closed by a tonneau cover. The top has a pair of spaced articulated side rail linkages interconnected by a plurality of spaced bows supporting a top cover. The rear bow engages the tonneau cover when the top is raised, and is pivoted up adjacent the rear rail to provide clearance for the tonneau cover to open when the top is raised and lowered. A top operating mechanism includes a bow control pressure linkage, comprising a pair of control links, interconnects the rear bow and each rear rail and the rear bow via a lost motion pivotal connection. The pressure linkage folds to raise the rear bow and unfolds to lower the rear bow. When fully unfolded, the pressure linkage moves overcenter to lock the rear bow in contact with the tonneau cover. When the pressure linkage folds to raise the rear bow, it initially moves back overcenter to unlock the rear bow. In one embodiment, a hydraulic cylinder connects between the automobile body and the upper control link. The cylinder retracts to fold the linkage and extends to unfold the linkage. In another embodiment, the cylinder is mounted on a bracket pivoted to the rear rail body pivot. An actuating link pivotally interconnects the cylinder bracket and the lower control link. Cylinder extension raises the rear bow to initially pull the control linkage overcenter and then fold it. Cylinder retraction unfolds the linkage.

4 Claims, 8 Drawing Sheets

CONVERTIBLE TOP MECHANISM WITH POWERED REAR ROW

BACKGROUND OF THE INVENTION

This invention relates generally to automobile convertible tops and, more particularly, to a convertible top mechanism having a powered movable rear bow.

Automobile convertible tops fall into two general classifications. In one, the rear portion of the top cover is attached directly to the automobile body. In the other, the rear portion of the top cover is attached to a movable rear bow which moves to sealingly engage the tonneau cover when the top is raised. The rear bow is moved of f the tonneau cover to permit its opening to receive the top when it is lowered.

Numerous arrangements have been utilized to move the rear bow. U.S. Pat. No. 4,720,133—Alexander discloses a convertible top mechanism having a rear bow that is held in engagement with the tonneau cover by an overcenter linkage that is latched in the overcenter position. This linkage is manually unlatched and manually moved overcenter to enable top lowering.

Convertible automobiles are increasing in popularity. Many of these convertibles are economically upscale and employ the more expensive movable rear bow type of construction. As such, they employ power top operation and, frequently, a powered tonneau cover and rear bow. U.S. Pat. No. 5,026,110—Koop et al and U.S. Pat. No. 5,042,868—Nothaft et al both disclose rear bow operators which have overcenter linkages that are moved by a power cylinder mounted between the rear bow and one of the links. The power cylinder operates a linkage latch during its initial retraction and its terminal extension.

This mounting of the power operator on the movable top linkage is bulky and requires routing flexible hydraulic lines through the movable top linkage. This is expensive, exposes the hydraulics to excessive wear, and increases the risk of damage. The mounting of the rear bow power actuator on the movable top linkage also increases the weight which must be moved by the top power actuators during top raising and lowering.

It would be desirable to provide a convertible top having a powered rear bow in which the power operator is mounted on the automobile body.

SUMMARY OF THE INVENTION

It is therefore an object of this invention to provide a convertible top having a powered rear bow in which the power operator is mounted on the automobile body.

In one aspect, this invention features a convertible automobile having a body including a storage well, a top movable between a raised position and a folded position stored within the well, a tonneau cover mounted for movement between a closed position, covering the well in top raised and lowered positions, and an open position enabling the top to be raised and lowered. The top has a pair of spaced articulated side linkages interconnected by a plurality of spaced bows supporting a top cover. Each said side linkage includes a rear rail pivoted to the body. A rear bow is pivotally mounted on the rear rails for movement between a lowered position engaging the tonneau cover when the top is raised and a raised position adjacent the rear rail to provide clearance for the tonneau cover to open and enable raising and lowering of the top. A rear bow control pressure linkage, comprising upper and lower pressure links, interconnects the rear bow and each rear rail and is moved overcenter by a power-operated movable actuating device to lock the rear bow in its lowered position. When the top is to be lowered, the pressure linkage is initially moved overcenter to unlock the rear bow.

In another aspect, this invention features a cylinder mounting bracket pivoted to the body at the rear rail pivot, an actuating link which is mounted on the cylinder bracket for limited pivotal movement relative thereto and is pivoted to the rear bow control pressure link, and a hydraulic cylinder that pivotally interconnects the cylinder mounting bracket and the rear bow. Initial extension of the hydraulic cylinder pivots the cylinder mounting bracket about the rear rail pivot to cause the actuating link to pull the rear bow control linkage overcenter, so that further cylinder extension raises the rear bow and folds the pressure linkage, as controlled by the actuating link. This enables the tonneau cover to open and close as the top is raised and lowered. Thereafter, contraction of the hydraulic cylinder initially lowers the rear bow until it engages the tonneau cover, whereupon further contraction pivots the cylinder mounting bracket to cause the actuating link to push the rear bow control linkage overcenter.

Preferably, a stop surface formed on the cylinder mounting bracket engages the actuating link after the rear bow control linkage has been moved back overcenter, which prevents further pivotal movement of the actuating link in one direction and controls the folding of the pressure linkage as further extension of the hydraulic cylinder raises the rear bow.

A lost motion connection is preferably incorporated in the lower pressure link pivot to the rear bow. The necessity of having, and length of this lost motion connection is dictated by the length of the rear bow, the height of the rear rail, and the travel path. Thus, some applications do not require a lost motion connection, but will utilize a fixed pivot.

In a further aspect, this invention features the power-operated movable actuating device as a hydraulic cylinder having its one end mounted for movement with the rear rail about the rear rail pivot and its other end pivoted to the upper control link. When the cylinder contracts, it moves the rear bow control linkage overcenter and folds it to enable the tonneau cover to open and close as the top is raised and lowered. When the cylinder extends, it unfolds and moves the rear bow control linkage overcenter after the top is raised.

These and further objects and features of this invention will become more readily apparent upon reference to the following detailed description of a preferred embodiment, as illustrated in the accompanying drawings, in which:

DETAILED DESCRIPTION OF PREFERRED EMBODIMENTS

Figure 1:
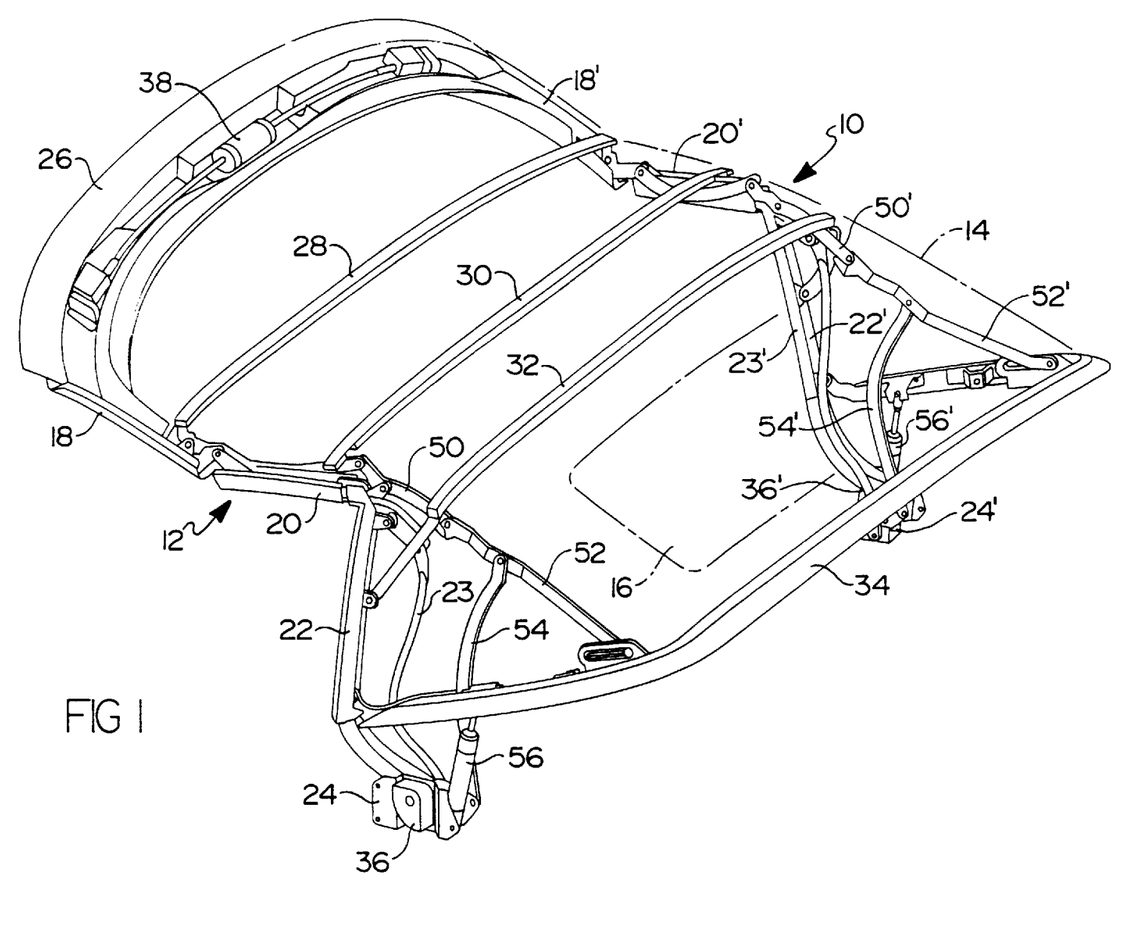
FIG. 1 is a perspective view of a topstack, shown with the rear bow partially raised.
Figure 2:
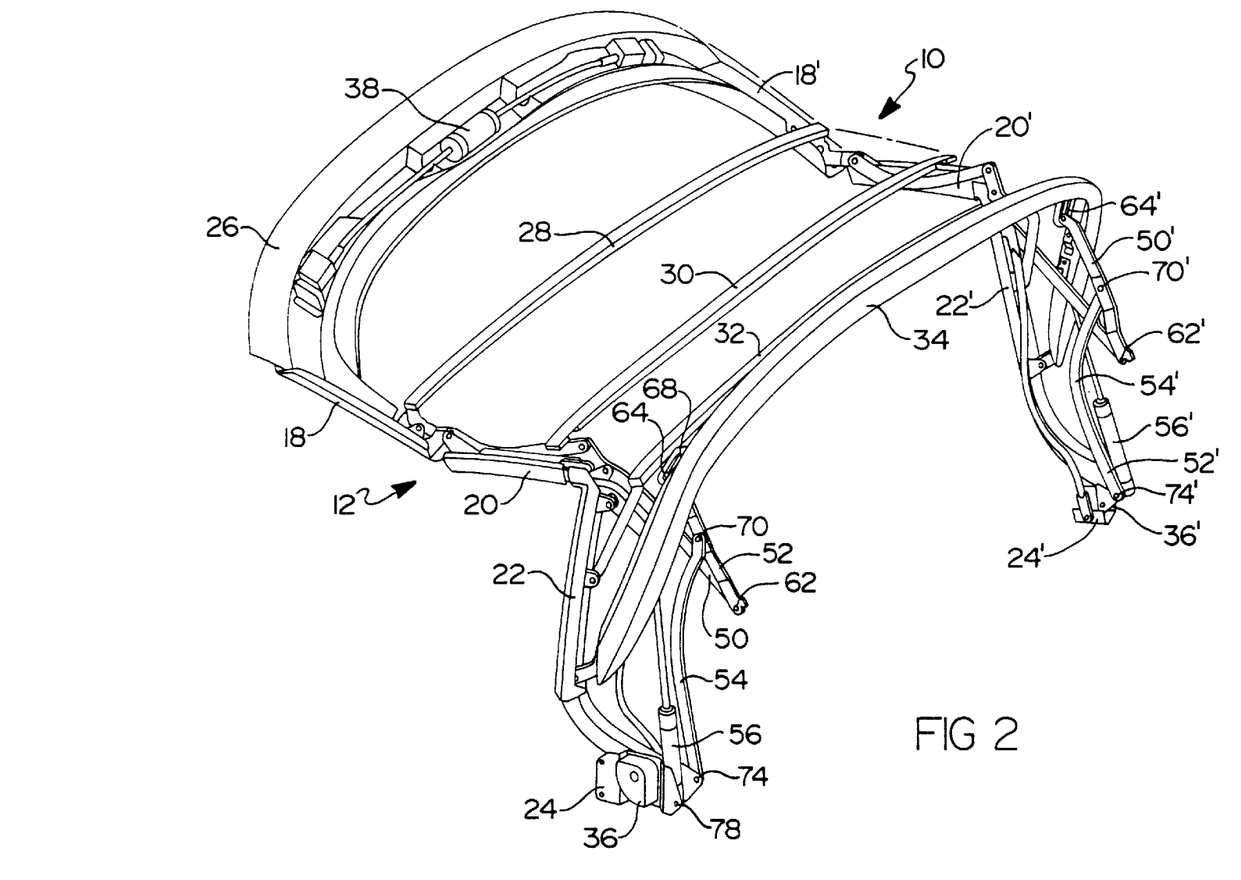
FIG. 2 is a view similar to FIG. 1, shown with the rear bow fully raised.

Referring now to FIGS. 1 and 2 of the drawings, an automobile convertible top 10 comprises a topstack 12 which is covered by a conventional fabric cover 14 that includes a backlight 16. Topstack 12 includes a pair of spaced, symmetrically identical articulated side linkages composed of pivotally interconnected front rails 18, 18', middle rails 20, 20', and rear rails 22, 22' and control links 23, 23' that are pivoted to automobile body mounting brackets 24, 24'.

The articulated side linkages are interconnected by a header or #1 bow 26, a #2 bow 28, #3 bow 30, #4 bow 32 and a rear or #5 bow 34 which mount and support the top cover 14. The top 10 is raised and lowered by a pair of hydraulic or electric rotary power actuators 36, 36' that are operated remotely by the automobile operator in a well-known manner. Header 26 incorporates a power-operated top latching mechanism 38 of the type disclosed in my earlier U.S. Pat. No. 5,284,378 which is operable to secure the header 26 to the automobile windshield header (not shown).

Figure 3:
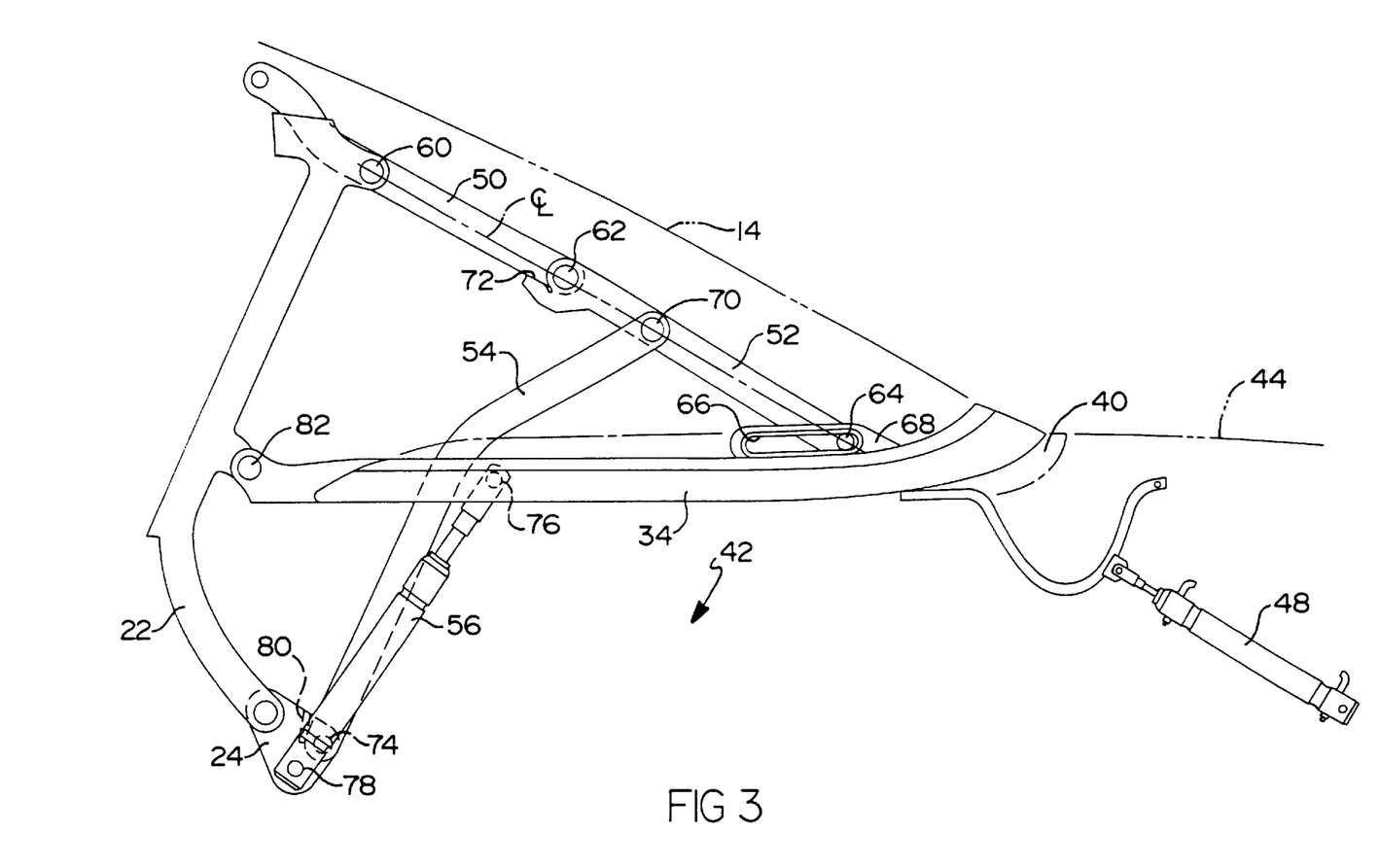
FIG. 3 is a partial side view of the topstack, with the tonneau cover closed and the rear bow lowered and locked.

When top 10 is raised, rear bow 34 sealingly engages the tonneau cover 40 which covers the storage well 42 for top 10 which is provided in automobile body 44, as shown in FIG. 3. When the top is to be lowered, rear bow 34 is raised to the position shown in FIG. 5 so that the tonneau cover 40 can be opened by a hydraulic actuator 48. Top 10 is then folded and lowered into well 42 for storage in a well-known manner, after which tonneau cover 40 is closed by actuator 48.

Movement of rear bow 34 is controlled by substantially identical bow control pressure linkages comprising interconnected bow control pressure links 50, 50' and 52, 52' that are operated by actuating links 54, 54', that are pivoted to mounting brackets 24, 24', under the control of hydraulic power cylinders 56, 56', also pivoted to mounting brackets 24, 24'. Since the structure and operation of both bow control linkages are identical, operation of rear bow 34 by the illustrated left side linkage will now be described with particular reference to FIGS. 3, 4 and 5.

Figure 4:
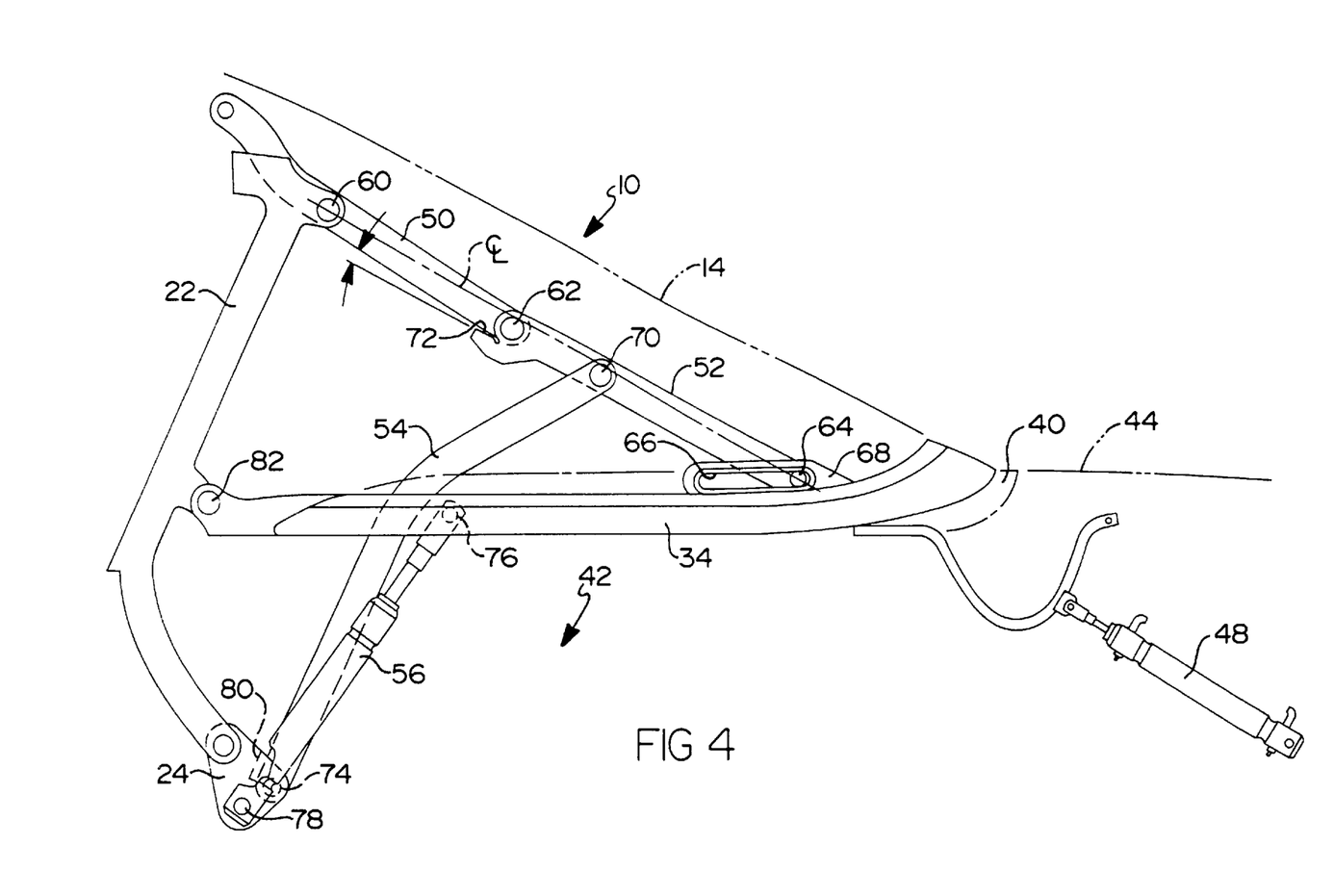
FIG. 4 is a view similar to FIG. 3, with the tonneau cover closed and the rear bow lowered and unlocked in preparation for raising the rear bow.
Figure 5:
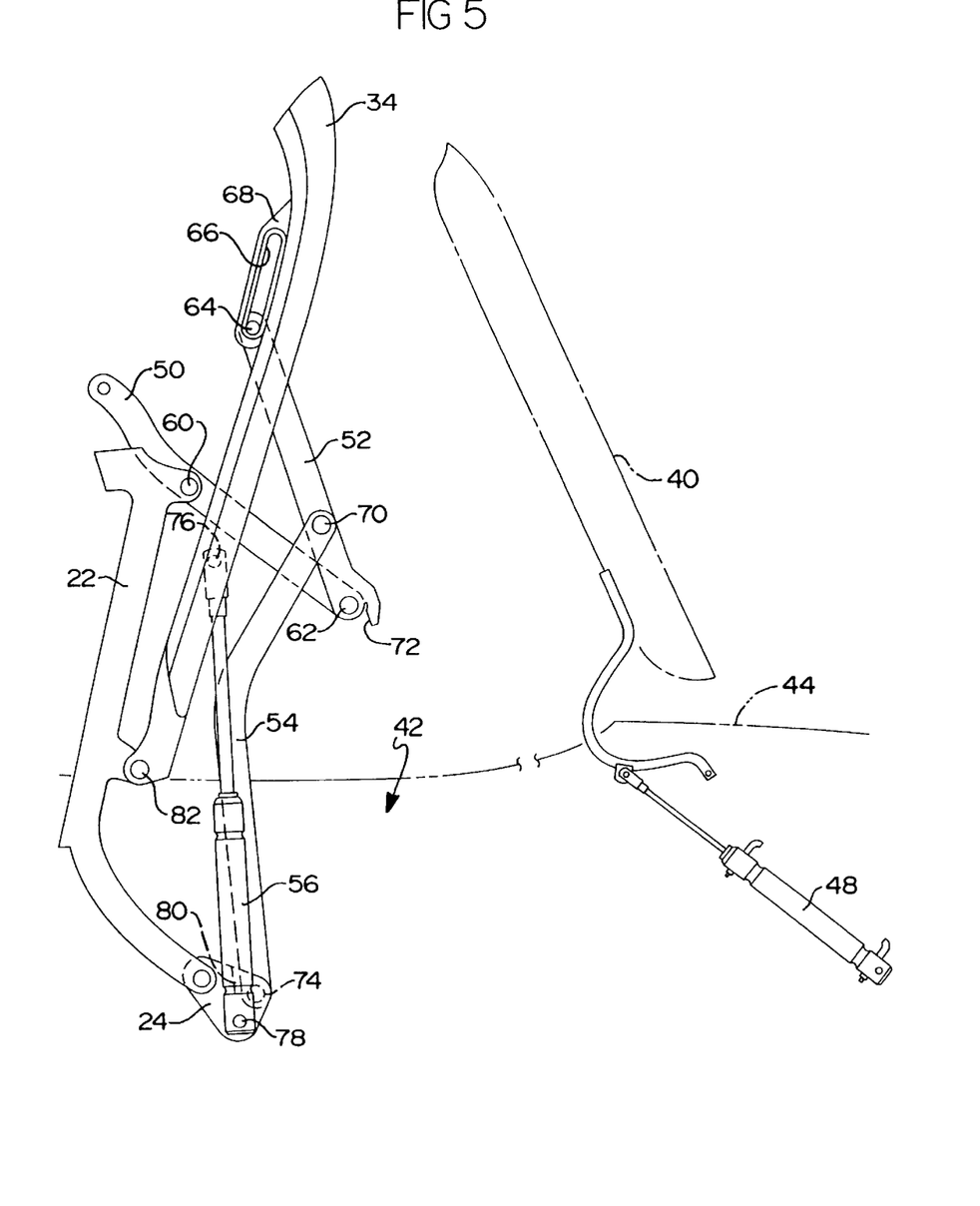
FIG. 5 is a view similar to FIG. 3, with the rear bow shown raised and the tonneau cover open.

Bow control link 50 is pivoted to rear rail 22 at 60 and to bow control link 52 at 62. Bow control link 52 is connected to rear bow 34 by a lost motion connection in the form of a pin 64 captured by a slot 66 in a bracket 68 on rear bow 34. Bow control link 52 is pivoted to actuating link 54 at 70 and includes a stop surface 72 adjacent pivot 62. Actuating link 54 is pivoted to mounting bracket 24 at 74, while power cylinder 56 is pivoted to rear bow 34 at 76 and to mounting bracket 24 at 78. Mounting bracket 24 carries an abutment 80 adjacent the lower end of actuating link 54.

A centerline ₵ extends between the pivot axes of pivots 60 and 64. In the FIG. 3 position, pivot 62 has been forced overcenter to a position above centerline ₵, as limited by the engagement of stop surface 72 with the inner end of bow control link 50. In this position, pivot 64 is at the end of slot 66 and rear bow 34 is forced down into sealing engagement with tonneau cover 40, where it is locked by the overcenter condition of pivot 62. Note that the lower end of actuating link 54 is slightly spaced from abutment 80.

When it is desired to lower and store top 10, cylinder 56 is actuated by a controller (not shown, which controls and coordinates operation of power actuators 36, 36', 56, 56' and 48) to extend. Since rear bow 34 is locked in position by pressure linkage 50, 52, the rod of cylinder 56 cannot extend to raise rear bow 34. Instead, cylinder 56 is forced downward, which pivots mounting bracket 24 and pulls actuating link 54 downward. This forces pressure linkage 50, 52 overcenter from the FIG. 3 position to the FIG. 4 position, where link 54 engages abutment 80 to unlock rear bow 34. Further extension of cylinder 56 extends its rod and pivot 76 upward to raise rear bow 34, pivoting it about pivot 82 until it lies adjacent rear rail 22, as shown in FIG. 5. As this is occurring, actuating link 54 guides pressure links 50, 52 into their illustrated folded position, out of the path of travel of tonneau cover 40. Abutment 80 also prevents any overcenter lockup of any of this linkage in its folded state.

The clearance created by movement of rear bow 34 enables tonneau cover 40 to be opened by extension of cylinder 48. Power actuators 36, 36' are then actuated to begin folding top 10, as shown in FIG. 5, and the top is further folded and lowered into storage well 42. Tonneau cover 40 is then closed by retraction of cylinder 48.

To raise top 10, cylinder 48 is actuated to extend and open tonneau cover 40. Top 10 is then raised to the FIGS. 2 and 5 position, with rear bow 34 lying adjacent rear rail 22. Next, cylinder 48 is retracted to close tonneau cover 40 and cylinder 56 is retracted to lower rear bow 34 into engagement with tonneau cover 40. This positions actuating link 54 and pressure links 50, 52 as shown in FIG. 4. The final retraction of cylinder 56 pulls the cylinder body upward, rotating bracket 24 counterclockwise, pushing actuating link 54 to move pivot 62 overcenter. This overcenter position of pressure linkage 50, 52 locks rear bow 34 in the FIG. 3 position against tonneau cover 40.

Figure 6:
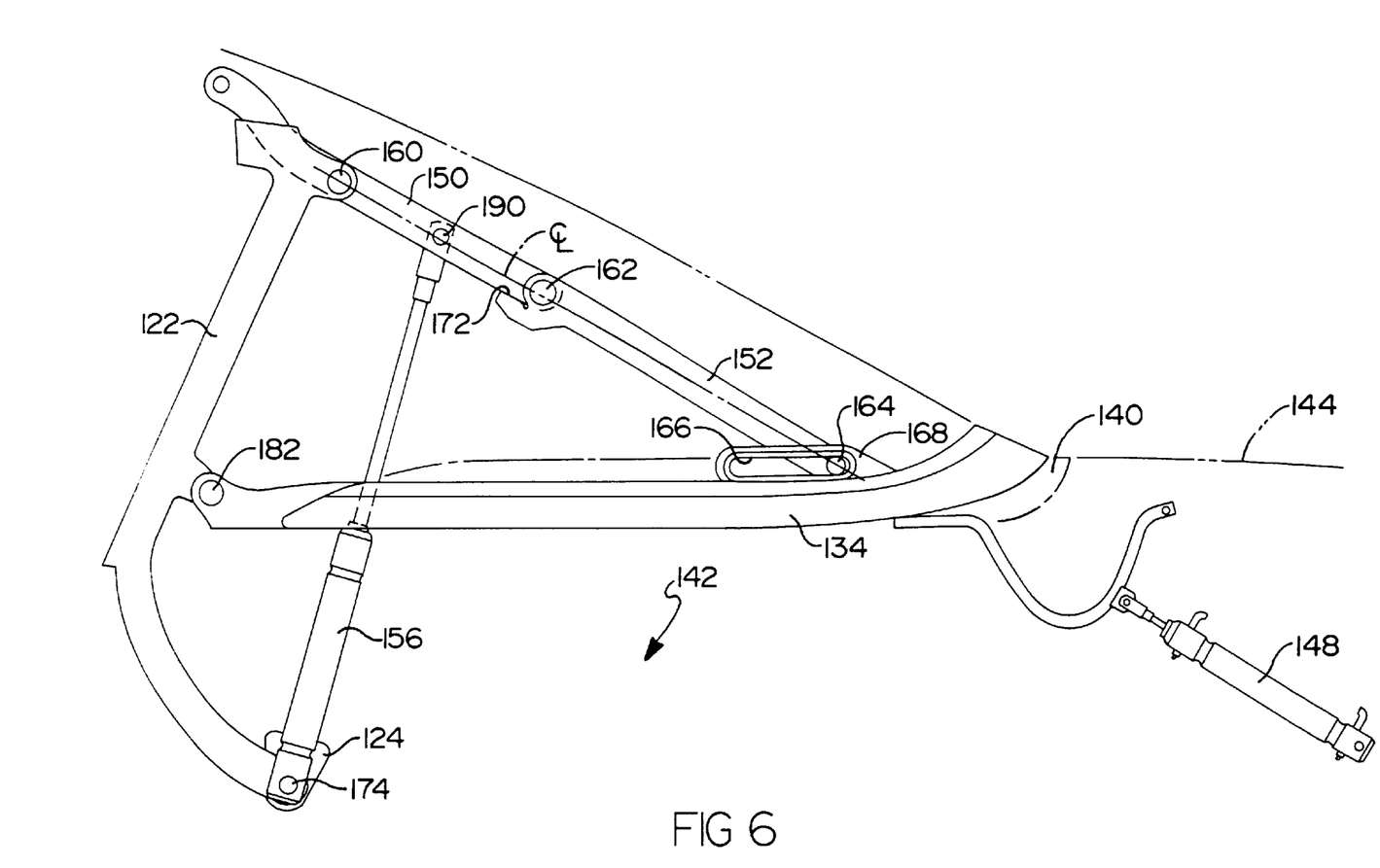
FIG. 6 is a partial view of an alternative embodiment of topstack, with the tonneau cover closed and the rear bow lowered and locked.
Figure 7:
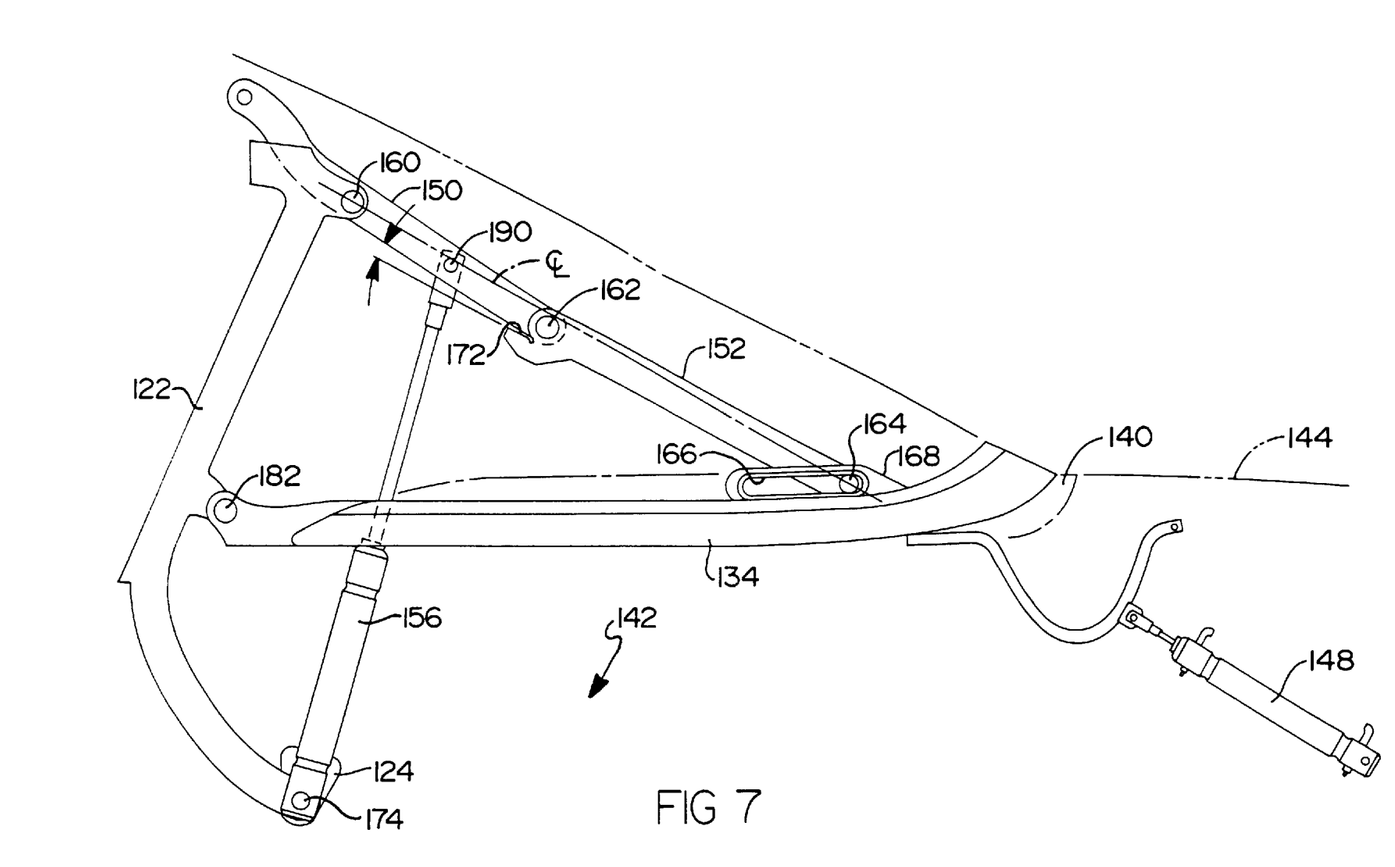
FIG. 7 is a view similar to FIG. 6, with the tonneau cover closed and the rear bow lowered and unlocked in preparation for raising the rear bow.
Figure 8:
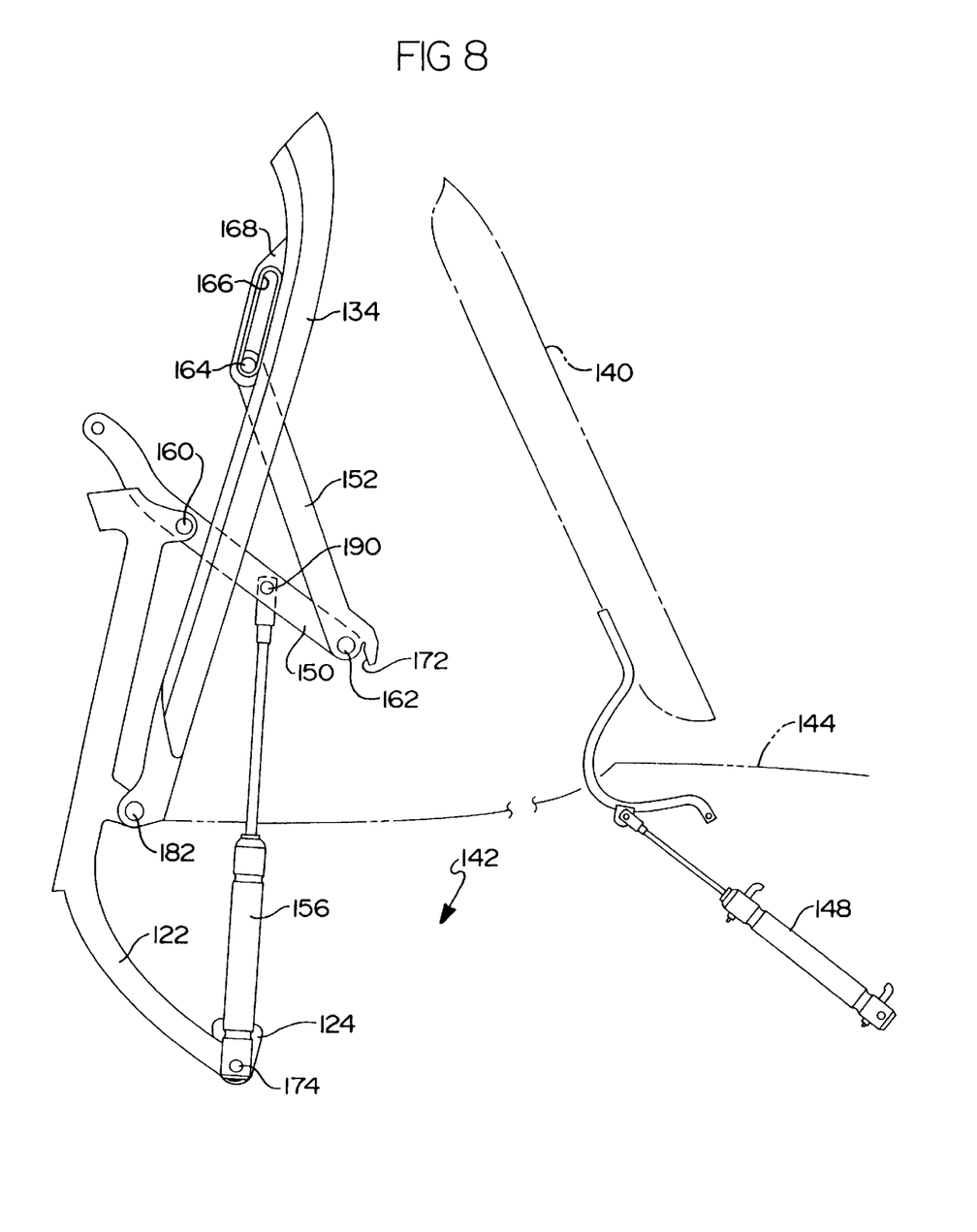
FIG. 8 is a view similar to FIG. 6, with the rear bow shown raised and the tonneau cover open.

Another embodiment of this invention is illustrated in FIGS. 6, 7 and 8, where elements common to both embodiments carry the same reference numbers increased by 100. Thus, the convertible top cover is 114 and the automobile body is 144. Operation of this embodiment is generally the same as just described. In the embodiment just described, cylinder 56 directly operates rear bow 34 and links 50 and 52 control bow position. In this embodiment there is no actuating link, and the rod end of cylinder 156 is pivoted at 190 to bow control link 150 and moves rear bow 134 through control links 150 and 152. Also, cylinder 156 is pivoted to body mounting bracket 124 on the same pivot as, or coaxially with the lower end of rear rail 122.

In the FIG. 6 position pivot 162 is overcenter and rear bow 134 is locked into engagement with tonneau cover 140 by rear bow control links 150 and 152, which are positioned as shown in FIG. 6 by full extension of cylinder 156 which engages the inner end of link 150 with stop surface 172. Initial retraction of cylinder 156 pulls control link 150 downward, moving pivot 162 overcenter to the FIG. 7 position, which unlocks rear bow 34. Further retraction of cylinder 156 begins folding links 150 and 152 which pulls pin 174 into engagement with the front end of slot 166. Thereafter, retraction of cylinder 156 folds control links 150 and 152, pulling pin 164 leftward, which forces rear bow 134 up to the FIG. 8 position, adjacent rear rail 122. As in the previous embodiment, this enables opening and closing of tonneau cover 140 and lowering and raising of top 110.

In both embodiments of this invention, the rear bow is controlled by operation of a hydraulic cylinder that is mounted on the automobile body, not on the top. This eliminates the problems caused by the prior art mounting of the power operator on the movable top linkage which requires routing flexible hydraulic lines through the movable top linkage and increases the weight which must be moved by the top power actuators during top raising and lowering.

While only preferred embodiments have been illustrated and described, obvious modifications thereof are contemplated within the scope of this invention and the following claims.

We claim:

1. A convertible top operating mechanism for a convertible top for an automobile that has a body including a storage well, said top being movable between a raised position and a folded position stored within the well, and has a tonneau cover mounted for movement between a closed position, covering the well in top raised and lowered positions, and an open position enabling the top to be raised and lowered, said top having a pair of spaced articulated side linkages interconnected by a plurality of spaced bows supporting a top cover, each said side linkage including a rear rail pivoted to the body, said plurality of bows including a rear bow pivotally mounted on the rear rails for movement between a lowered position engaging the tonneau cover when the top is raised and a raised position adjacent the rear rail to provide clearance for the tonneau cover to open and enable raising and lowering of the top, the operating mechanism including a rear bow control pressure linkage interconnecting the rear bow and each rear rail which folds to raise the rear bow and unfolds to initially lower the rear bow and then moves overcenter to lock the rear bow in its lowered position, and operating means for moving the rear bow, characterized by the operating means comprise a power-operated movable actuating device pivotally interconnecting the automobile body and each bow control pressure linkage for moving the control linkage overcenter to lock and unlock the rear bow, for moving the rear between raised and lowered positions, and for enabling the rear bow to remain adjacent to and move with the rear rail about the rear rail pivot as the top is raised and lowered, further characterized by each rear bow control pressure linkage comprising an upper control link pivoted to the rear rail and a lower control link pivoted to the rear bow and to the upper control link, and by the power-operated movable actuating device being a hydraulic cylinder having its one end mounted for movement with the rear rail about the rear rail pivot to the body and its other end pivoted to the upper control link, the cylinder extending, to open and move the rear bow control pressure linkage overcenter after the top is raised, and contracting, to move the rear bow control pressure linkage overcenter and fold it to enable the tonneau cover to open and close as the top is raised and lowered.

2. A convertible top operating mechanism for a convertible top for an automobile that has a body including a storage well, said top being movable between a raised position and a folded position stored within the well, and has a tonneau cover mounted for movement between a closed position, covering the well in top raised and lowered positions, and an open position enabilng the top to be raised and lowered, said top having apairof spaced articulated side linkages intercon- nected by a plurality of spaced bows supporting a top cover, each said side linkage including a rear rail pivoted to the body, said plurality of bows including a rear bow pivotally mounted on the rear rails for movement between a lowered position engaging the tonneau cover when the top is raised and a raised position adjacent the rear rail to provide clearance for the tonneau cover to open and enable raising and lowering of the top, the operating mechanism including a rear bow control pressure linkage interconnecting the rear bow and each rear rail which folds to raise the rear bow and unfolds to initially lower the rear bow and then moves overcenter to lock the rear bow in its lowered position, and operating means for moving the rear bow, characterized by the operating means comprising a power-operated movable actuating device pivotally interconnecting the automobile body and earth bow control pressure linkage for moving the control linkage overcenter to lock and unlock the rear bow, for moving the rear bow between raised and lowered positions, and for enabling the rear bow to remain adjacent to and move with the rear rail about the rear rail pivot as the top is raised and lowered, further characterized by each rear bow control pressure linkage comprising an upper control link pivoted to the rear rail and a lower control link pivoted to the rear bow and to the upper control link, a cylinder mounting bracket pivoted to the body at the rear rail pivot to the body, and the power-operated movable actuating device comprising an actuating link mounted on the cylinder bracket for limited pivotal movement relative thereto and pivoted to the rear bow control pressure linkage and a hydraulic cylinder pivotally interconnecting the cylinder mounting bracket and the rear bow, whereby initial extension of the hydraulic cylinder pivots the cylinder mounting bracket about the rear rail pivot to the body to cause the actuating link to pull the rear bow control pressure linkage overcenter, and further cylinder extension raises the rear bow and folds said linkage, as controlled by the actuating link, to enable the tonneau cover to open and close as the top is raised and lowered, while contraction of the hydraulic cylinder initially lowers the rear bow until it engages the tonneau cover, whereupon further contraction pivots the cylinder mounting bracket to cause the actuating link to push the rear bow control pressure linkage overcenter.

3. The convertible top operating mechanism of claim 2, further characterized by a stop surface formed on the cylinder mounting bracket for engaging the actuating link after the rear bow control pressure linkage has been moved back overcenter to prevent further pivotal movement relative thereto in one direction and cause further extension of the hydraulic cylinder to raise the rear bow and force the rear bow pressure control pressure linkage to fold.

4. The convertible top operating mechanism of claim 3, further characterized by a lost motion connection incorporated in the lower control link pivot to the rear bow to enable movement of said pivot relative to the rear bow during initial extension of the hydraulic cylinder as the rear bow control pressure control linkage moves back overcenter to unlock the rear rail.

* * * * *